(12) United States Patent
Mayer et al.

(10) Patent No.: US 7,716,095 B2
(45) Date of Patent: May 11, 2010

(54) WEB-BASED FINANCIAL REPORTING SYSTEM AND METHOD

(75) Inventors: Glenn Mayer, Bethesda, MD (US); Jeffrey Wise, Fairfax, VA (US); Christopher T. Downey, Arlington, VA (US); Michael Hoolehan, Frederick, MD (US); Adam G. Siegel, Leesburg, VA (US); Kurt L. Heckman, Hagerstown, MD (US); Ryan Herbert, Frederick, MD (US)

(73) Assignee: Fannie Mae, Washington, DC (US)

( * ) Notice: Subject to any disclaimer, the term of this patent is extended or adjusted under 35 U.S.C. 154(b) by 2082 days.

(21) Appl. No.: 10/353,068

(22) Filed: Jan. 29, 2003

(65) Prior Publication Data

US 2004/0064331 A1 Apr. 1, 2004

Related U.S. Application Data

(63) Continuation of application No. 10/259,831, filed on Sep. 30, 2002, now abandoned.

(51) Int. Cl.
*G06Q 40/00* (2006.01)
(52) U.S. Cl. ............................................. 705/35
(58) Field of Classification Search ............ 705/35, 705/7
See application file for complete search history.

(56) References Cited

U.S. PATENT DOCUMENTS

| | | | |
|---|---|---|---|
| 5,704,045 | A | 12/1997 | King et al. |
| 5,802,499 | A | 9/1998 | Sampson et al. |
| 5,970,479 | A | 10/1999 | Shepherd |
| 6,134,536 | A | 10/2000 | Shepherd |
| 6,157,918 | A | 12/2000 | Shepherd |
| 6,556,974 | B1 * | 4/2003 | D'Alessandro ............... 705/10 |
| 6,622,130 | B1 | 9/2003 | Shepherd |
| 6,968,316 | B1 * | 11/2005 | Hamilton ................... 705/36 R |
| 7,222,095 | B2 * | 5/2007 | Squyres .................... 705/36 R |
| 2001/0027437 | A1 | 10/2001 | Turbeville et al. |

(Continued)

FOREIGN PATENT DOCUMENTS

WO    WO 9618160 A1    6/1996

(Continued)

OTHER PUBLICATIONS

Financial Express Crisil gives highest-safety rating to ICICIdirect.com, Oct. 5, 2001.*

*Primary Examiner*—Jagdish N Patel
(74) *Attorney, Agent, or Firm*—Foley & Lardner LLP (57) ABSTRACT

A computer system for facilitating in accessing and reporting detailed financial information from non-depository financial institutions and for enabling comparison of performance of similarly situated non-depository institutions. The system includes a web site and at least one processing component. The web site is used for collecting financial information for predefined periods from the non-depository financial institutions. The processing component processes the information for selected time periods entered into the web site and stores the information in at least one database. The processing information also uses the information entered by all non-depository institutions to determine the status of each non-depository and to generate financial analytical information for internal use within a federally chartered corporation. Thereafter, the processing component uses the information entered by all non-depository institutions to provide a peer report for comparing the performance of similarly situated financial institutions.

23 Claims, 5 Drawing Sheets

U.S. PATENT DOCUMENTS

| | | |
|---|---|---|
| 2002/0032635 A1 | 3/2002 | Harris et al. |
| 2002/0133368 A1* | 9/2002 | Strutt et al. .................... 705/1 |
| 2002/0152156 A1 | 10/2002 | Tyson-Quah |
| 2003/0009421 A1 | 1/2003 | Bansal et al. |
| 2003/0046137 A1* | 3/2003 | Dickerson, Jr. .............. 705/10 |
| 2003/0050830 A1* | 3/2003 | Troyer ......................... 705/11 |
| 2003/0061141 A1* | 3/2003 | D'Alessandro ............. 705/36 |
| 2003/0172014 A1* | 9/2003 | Quackenbush et al. ........ 705/35 |
| 2003/0208388 A1* | 11/2003 | Farkas et al. ................... 705/7 |
| 2003/0208422 A1 | 11/2003 | Burczyk |
| 2004/0024692 A1 | 2/2004 | Turbeville et al. |
| 2004/0162862 A1 | 8/2004 | Hull et al. |

FOREIGN PATENT DOCUMENTS

| | | |
|---|---|---|
| WO | WO 9621903 A1 | 7/1996 |
| WO | WO 9703409 A1 | 1/1997 |
| WO | WO 0139060 A1 | 5/2001 |
| WO | WO 0150329 A2 | 7/2001 |
| WO | WO 0211040 A1 | 2/2002 |
| WO | WO 0231732 A1 | 4/2002 |

* cited by examiner

Peer Comparison Report

Chart - 402

|  | Your Company | Origination Portfolio Class Median | Origination Portfolio Class Percentile | Servicing Portfolio Class Median | Servicing Portfolio Class Percentile | Company Type Class Median | Company Type Class Percentile |
|---|---|---|---|---|---|---|---|
| Total Equity | $801 | $2,196 | 8.50% | $2,216 | 18.80% | $2,127 | 17.40% |
| Total Assets | $14,959 | $15,410 | 47.00% | $15,754 | 47.80% | $14,234 | 51.30% |
| Net Income | $159 | $151 | 11.70% | $142 | 8.50% | $131 | 6.80% |
| ... | | | | | | | |

Peer Group Detail - 404

There were 860 institutions reporting for this period. Based on the calculations listed below, your institution is assigned to the Origination Portfolio Size Class and Servicing Portfolio Size Class, Origination Portfolio Size Class
A. $0 B. $1-25,000
C. $25,000-100,000
D. $10,000-500,000
E. $500,000 or more
Your group: $100,000-$500,000
Companies in peer group: 247

Service Portfolio Size Class
A. $0 B. $1-100,000
C. $100,000-500,000
D. $500,000-5,000,000
E. $5,000,000 or more
F. >70% Income Property (L060+L160)/(L100/L200)
Your group: $0
Companies in peer group: 437

Peer Comparison Calculations - 406

Your percentile for an item is calculated as the percentage of companies in your peer group.

- Total Equity B200
- Total Assets A400
- Net Income D350

WEB-BASED FINANCIAL REPORTING SYSTEM AND METHOD

This application discloses and claims only subject matter disclosed in prior application Ser. No. 10/259,831, filed on Sep. 30, 2002 and names inventors named in the prior application. Accordingly this application constitutes a continuation of application Ser. No. 10/259,831.

FIELD OF THE INVENTION

The present invention relates to a system and method for reporting financial data, and more particularly to an electronic system and method for facilitating access to and reporting of financial information from non-depository institutions.

BACKGROUND OF THE INVENTION

Many financial institutions that accept deposits and that are federally insured are required to regularly report detailed financial information to a variety of federal and state regulatory agencies. Examples of depository financial institutions include banks, thrifts and credit unions. However, many non-depository financial institutions, such as mortgage banks, are not federally insured and/or regulated and do not have to provide the same detailed financial information to either federal or state regulatory agencies.

The United States Congress passed federal laws that create some corporations with government agency status and chartered these corporations to perform certain tasks, such as providing liquidity to the secondary mortgage market and promoting homeownership among low and moderate income families. Non-depository institutions regularly work with these federally chartered corporations. To carry out their charters, federally chartered corporations also require access to detailed financial information from all institutions choosing to do business with them. Therefore, all non-depository institutions doing business with federally chartered corporations provide similar detailed information to these corporations as the information federally insured institutions provide to federal and state regulatory agencies.

Non-depository institutions previously reported detailed financial information to federally chartered corporations by filling out "hard" or paper forms. In order to fill out the paper forms, each non-depository institution generally collected the required information from multiple sources and transcribed the information onto the paper forms. Upon receiving the paper forms, each federally chartered corporation entered the information into databases and other sources for internal uses. The use of paper forms required substantial time and costs from both the provider and the receiver of the financial information.

To reduce the time and costs associated with reporting financial information through paper forms, each federally chartered corporation now sends out the appropriate forms to each non-depository institution on electronic storage means, such as floppy diskettes or compact disks. The non-depository institution still obtains the information from multiple sources, such as databases, enters the detailed financial information in the forms, and returns the storage means to the federal chartered institution. The federally chartered corporation retrieves the information from each storage means and stores the information in internal databases for further processing. While providing financial information through electronic storage means reduces the costs associated with paper forms to the provider and receiver of the financial information, this method is still inefficient. For example, there are costs associated with mailing the diskettes and retrieving and storing information from and to each storage means. Storage means also may be lost or stolen during transmission to and from the receiver and/or sender.

Moreover, non-depository institutions are highly competitive with each other. Therefore, these institutions are very interested in similarly situated non-depository institutions' (peers) performances. As such, non-depository institutions typically base employees' compensation on how they perceive similarly situated non-depository institutions' performances. Nevertheless, there is currently no objective comparison of similarly situated non-depository institutions. Therefore, there is no means for a non-depository institutions to actually determine how peer institutions are actually performing.

What is needed, therefore, is an efficient system and method for obtaining detailed financial information from non-depository institutions and for providing information about similarly situated non-depository institutions' performances without disclosing specific financial information provided by one or more non-depository institutions.

SUMMARY OF THE INVENTION

The present invention is a computer system for facilitating in accessing and reporting detailed financial information from non-depository financial institutions and for enabling comparison of performance of similarly situated non-depository institutions. The system includes a web site and at least one processing component. The web site is used for collecting financial information for predefined periods from the non-depository financial institutions. The processing component processes the information for selected time periods entered into the web site and stores the information in at least one database. The processing information also uses the information entered by all non-depository institutions to determine the status of each non-depository institution and to generate financial analytical information for internal use within a federally chartered corporation. Thereafter, the processing component uses the information entered by all non-depository institutions to provide a peer report for comparing the performance of similarly situated financial institutions.

Specifically, the system registers each non-depository financial institution and provides a password prior to collecting detailed financial information from the non-depository financial institution. Alternatively, each non-depository financial institution may create a password for accessing the system. Thereafter, each non-depository financial institution is allowed to enter detailed financial information for predefined periods after entering the password in the web site. The processing component converts the detailed financial information to appropriate formats and stores the information in a database associated with the web site. The processing component then uses the information entered by all non-depository institutions to determine the risk associated with doing business with each non-depository institution. The system then locks portions of the web site for collecting information after a deadline. The processing component uses the information entered by all non-depository institutions to generate financial analytical information for internal use with each federally chartered corporation and provides a peer report for comparing the performance of similarly situated financial institutions.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawing. The present invention described below extends the functionality of the inventive system and method for facilitating reporting of detailed financial information by non-depository institutions.

Figure 1:
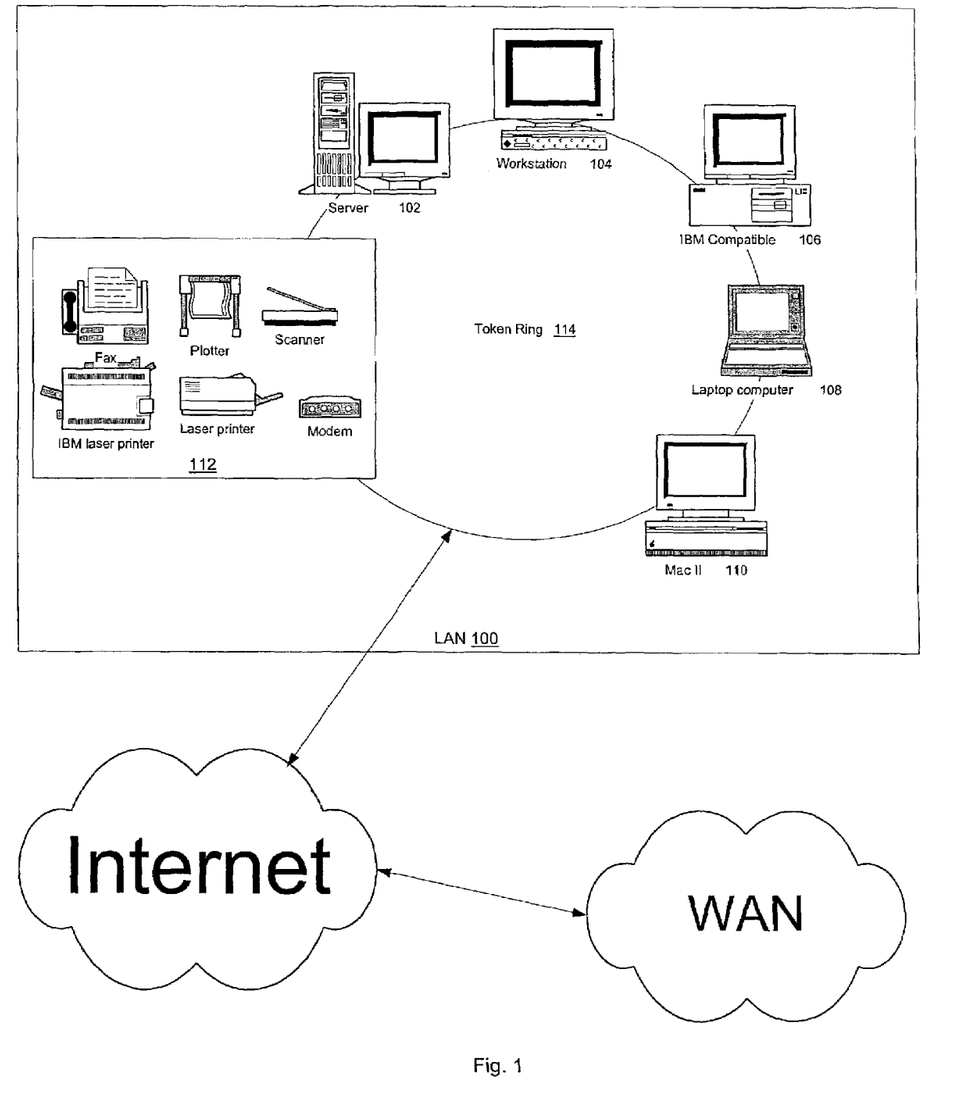
FIG. 1 illustrates a local area network (LAN) 100 that is configured to facilitate access to and reporting of detailed financial information by non-depository institutions.

FIG. 1 illustrates a local area network (LAN) 100 that is configured to facilitate access to and reporting of detailed financial information by non-depository institutions. LAN 100 comprises a server 102, four computer systems 104-110, and peripherals, such as printers and other devices 112, that may be shared by components on LAN 100. Computer system 104-110 may serve as clients for server 102 and/or as clients and/or servers for each other and/or for other components connected to LAN 100. Components on LAN 100 are preferably connected together by cable media, for example copper or fiber-optic cable and the network typology may be a token ring topology 114. It should be apparent to those of ordinary skill in the art that other media, for example, wireless media, such as optical and radio frequency, may also connect LAN 100 components. It should also be apparent that other network topologies, such as Ethernet, may be used.

According to the invention, LAN 100 is connected to the Internet and may be connected to other LANs or Wide Area Networks (WAN). Hence some components of LAN 100 are preferably Web-enabled. The computer processor for executing the inventive system and method, for example server 102 and/or computer systems 104-110, include electronic storage media, such as disks, for storing programming code and data structures used to implement the inventive method and outputs therefrom. The invention uses a computer system, for example computer system 104, to implement an inventive application for gathering detailed financial information from non-depository institutions. Note that any computer system may be configured to implement the inventive method and computer system 104 is only used for exemplary purpose.

Figure 2:
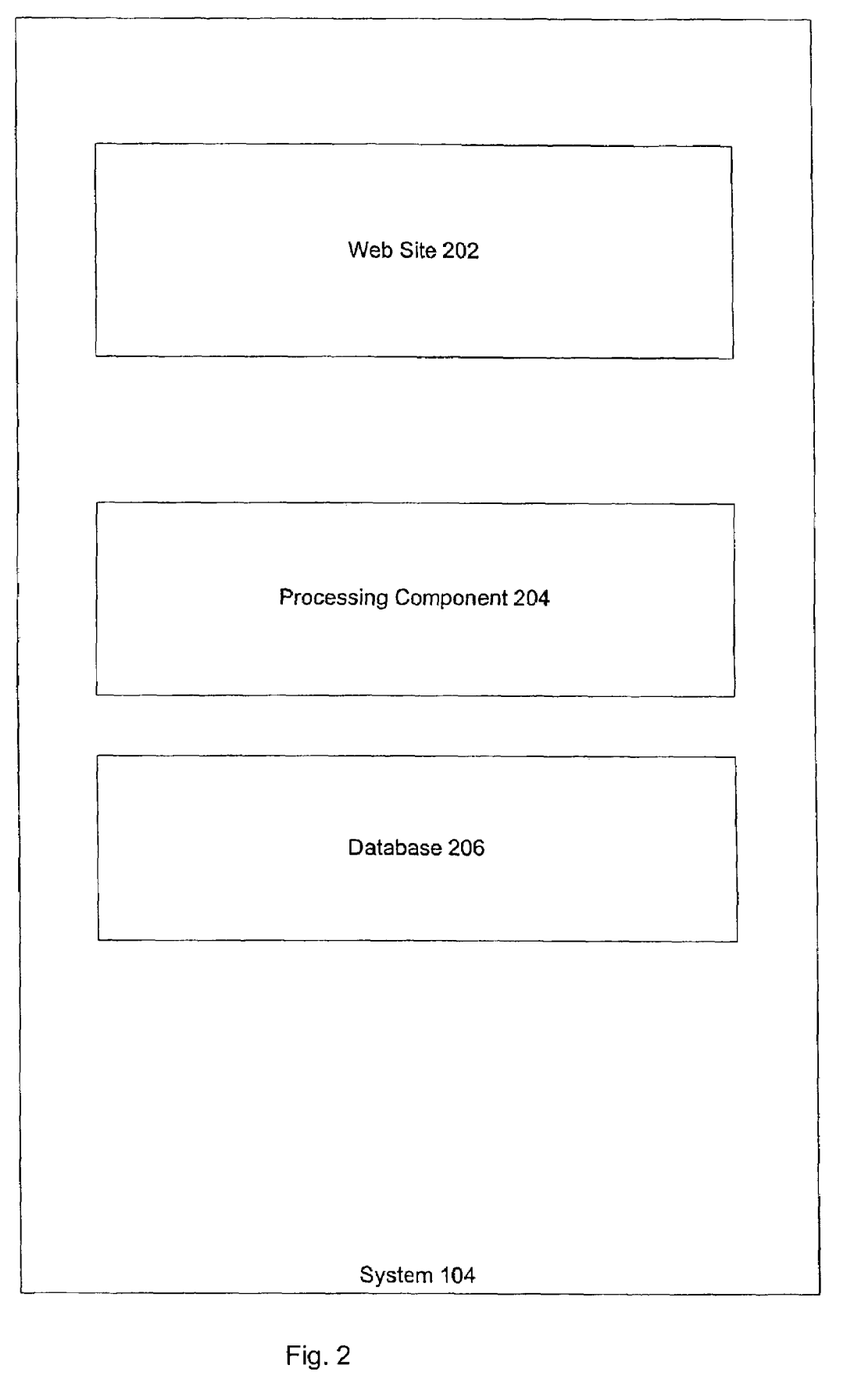
FIG. 2 illustrates components used in a computer system that facilitates in gathering detailed financial information from non-depository institutions and provides a peer comparison to participating non-depository institutions.

FIG. 2 illustrates components used in computer system 104 that facilitate in gathering detailed financial information from non-depository institutions and provide a peer comparison to participating non-depository institutions. Computer system 104 includes a web site 202, a processing component 204, and a database 206. Web site 202 includes forms for collecting and displaying financial information from and to non-depository institutions that work with federally chartered corporations. Processing component 204 processes the information entered into web site 202 and stores the information in database 206. Employees of non-depository institutions access web site 202 through a web browser, such as Internet Explorer.

Figure 3:
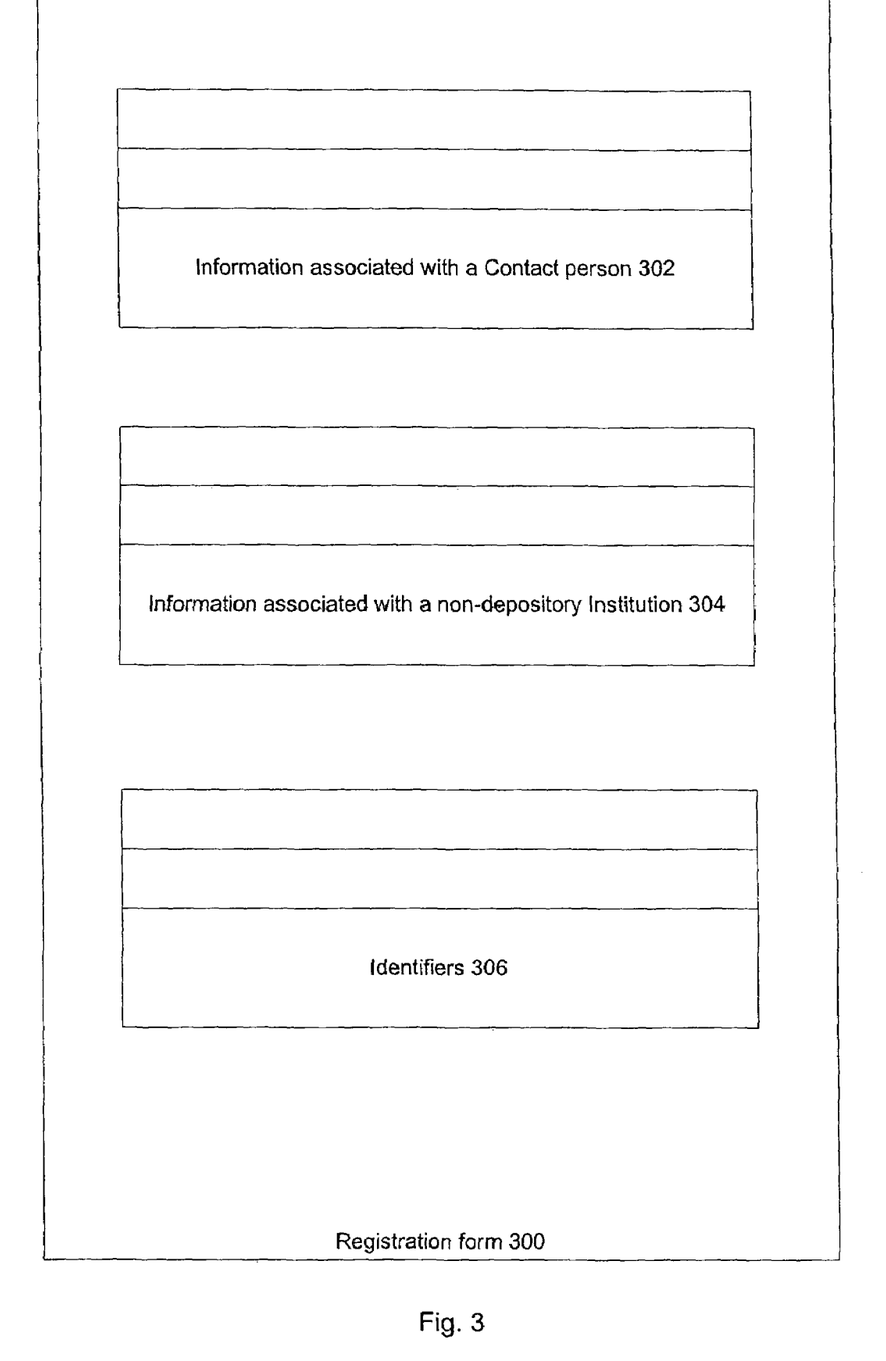
FIG. 3 illustrates a form with information that is associated with each non-depository institution.

Prior to providing financial information, employees of each non-depository institution must register the institution with system 104 by entering information associated with the non-depository institution. FIG. 3 illustrates a registration form 300 with information that is associated with each non-depository institution. Registration form 300 includes information associated with a contact person 302, information associated with the institution 304, and identifiers 306 for the federally chartered corporations with which each non-depository institution does business. Information related to the contact person 302 includes the name, position, telephone number and address of the contact person(s). Information 302 also preferably is required to include an e-mail address for each contact person in the non-depository institution and an e-mail address for each person entering detailed financial information in system 104. Information 304 related to the institution includes, among other things, the non-depository institution's name, address, identifier, company type (for example privately held company), whether the institution is owned by a female or a member of a minority group, date of most recent audit, and name of auditing company. As is apparent to those skilled in the art, registration form 300 may be configured to include other information for registering non-depository institutions with system 104. Upon filling out the information in registration form 300, each institution is then issued a password for accessing the secured portions of web site 202. As is obvious to one skilled in the art, system 104 also may enable each non-depository financial institution to provide a password for entering secured portions of web site 202.

In a preferred embodiment of the invention, all non-depository institutions must enter detailed financial information for predefined time periods by predefined deadlines. For example, all non-depository institutions must enter detailed financial information for the first quarter in a calendar year on or before April 30th. System 104 includes means for notifying non-depository institutions that have not reported prior to and/or after each predefined deadline. For example, system 104 may send a reminder e-mail to the contact person identified during registration of the non-reporting non-depository institution. Web site 202 also includes broadcast message boards and posting boards for broadcasting messages to some or all non-depository institutions.

After registration with system 104, employees of each non-depository institution enter the previously assigned or created password to access secure portions, such as data gathering forms and data reporting forms, of web site 202. Upon gaining access to the data gathering forms, employees of each non-depository institution are preferably required to select a time period that is associated with the financial information. Examples of financial information associated with time periods include financial information associated with each quarter or month in a calendar year. In an alternate embodiment, employees may be required enter information for one time period, such as a current quarter. As would be obvious, web site 202 may be configured in various ways so that employees of non-depository information may enter financial information related to one or more periods.

Thereafter, each non-depository institution provides detailed financial information to system 104 either manually, by entering the information into forms on web site 202, or electronically, by linking databases in the non-depository institution with database 206. Examples of detailed financial information include balance sheet information, income statement, information related to loan origination and information related to the non-depository institution's loan portfolio. Web site 202 includes an editing function for enabling providers of information to edit the information prior to submission and an error correction function for checking data after submission. After the information is entered in web site 202 and submitted to system 104, web site 202 executes the error correction function to determine if there are any errors and/or omissions of required information. If there are errors and/or omissions, web site 202 preferably provides an opportunity for the errors and/or omissions to be corrected. If there are no errors and/or omissions, web site transmits the information to processing component 204.

Processing component 204 converts the information to appropriate formats and stores the information in database 206. Processing component 204 also determines the health of each non-depository institution based on the information entered by all non-depository institutions. Processing component then determines the risk associated with doing business with each non-depository institution. Thereafter, processing component 204 generates ratios and other financial analytical information for use within the federally chartered corporation.

After each predefined deadline, system 104 locks forms for entering data on web site 202 and prevents non-depository institutions from entering financial data. In a preferred embodiment, employees of the federally chartered corporation may unlock the forms and allow the non-depository institution to enter financial information after the deadline. At predetermined times, for example once a night for a defined time period, processing component 204 generates a peer comparison financial report.

Figure 4:
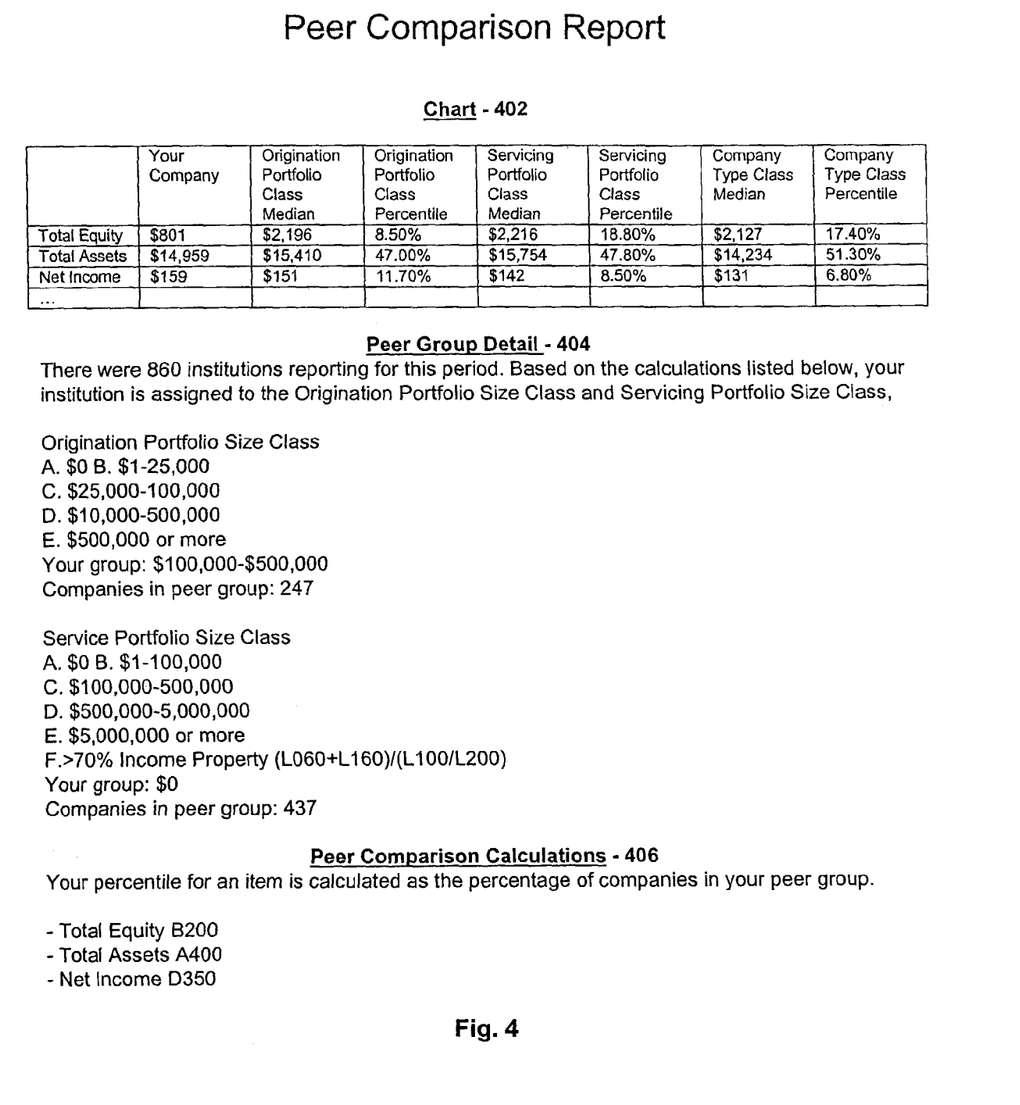
FIG. 4 illustrates a peer comparison report.

FIG. 4 illustrates a peer comparison report. The peer comparison report includes aggregated statistics of financial information for peer groups, i.e., groups of similarly situated non-depository institutions. The peer comparison report in FIG. 4 includes a chart 402 with information on similarly situated companies, a peer group detail 404 section for identifying which peer group(s) a specific company is assigned to, and a peer comparison calculation 406 section for identifying calculations of each item used in the peer comparison report. An example of a peer group of non-depository institutions is a group of institutions with the same business volume. An example of statistics included in a peer report may be the return on equity for companies with the same business volume. The peer report enables each non-depository institution and each federally chartered corporation to determine the performances of all similarly situated non-depository institutions.

Figure 5:
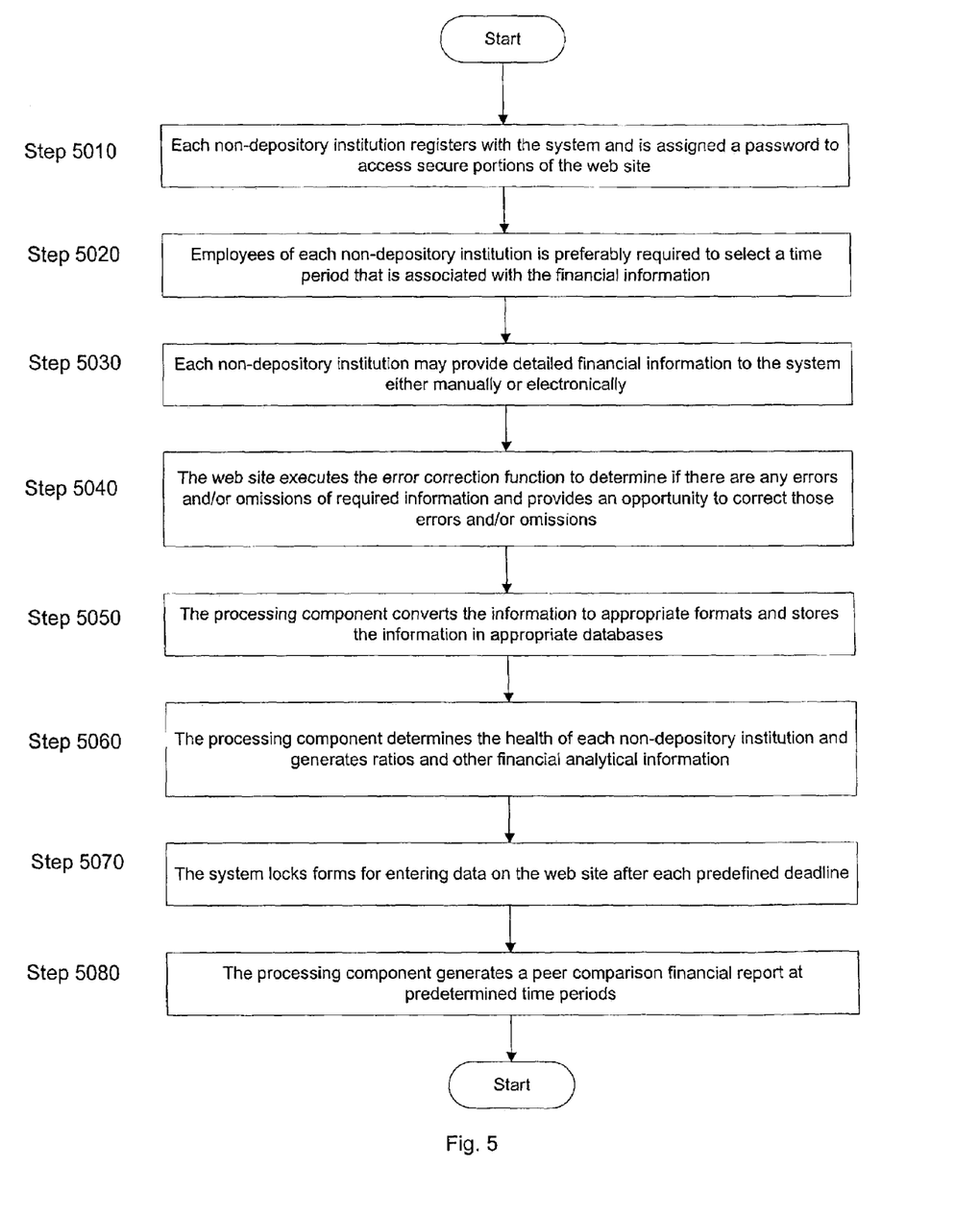
FIG. 5 illustrates the steps implemented in applying the inventive system.

FIG. 5 illustrates the steps implemented in applying the inventive system. In Step 5010, each non-depository institution registers with system 104 and is assigned or creates a password to access secure portions of web site 202. In Step 5020, employees of each non-depository institution are required to select a time period that is associated with the financial information being entered. In Step 5030, each non-depository institution may provide detailed financial information to system 104 either manually or electronically. In Step 5040, after information is entered in web site 202 and submitted to system 104, web site 202 executes the error correction function to determine if there are any errors and/or omissions of required information and provides an opportunity to correct any errors and/or omissions. In Step 5050, processing component 204 converts the information to appropriate formats and stores the information in database 206. In Step 5060, processing component 204 also determines the health of each non-depository institution and generates ratios and other financial analytical information for use within the federally chartered corporation.

In Step 5070, system 104 locks forms for entering data on web site 202 after each predefined deadline. In Step 5080 processing component 204 generates a peer comparison financial report at predetermined time periods to compare performances of similarly situated non-depository institutions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A computer system for facilitating in accessing and reporting detailed financial information from non-depository financial institutions and for enabling comparison of performance of similarly situated non-depository institutions, the system comprising:

a user interface configured to display a web site having a registration form, the web site configured to receive a selection of a time period and configured to collect financial information for the selected periods from the non-depository financial institutions, the financial information including at least balance sheet information, loan origination information, and loan portfolio information;

a processing component configured to process the financial information for the selected time period and store the information in at least one database, the processing component further configured to determine the status of each non-depository institution, to determine a risk associated with doing business with each non-depository institution from the financial information, to generate financial analytical information and to provide a peer report for comparing the performance of similarly situated financial institutions;

the at least one database operatively connected with the processing component and the user interface, the financial information entered via the web site of the user interface and processed by the processing component being stored in the database; and a reporting component configured to display the peer report on the web site, the peer report containing at least a portion of the processed financial information illustrating the risk associated with doing business with the at least one of the similarly situated non-depository institutions in comparison to other of the similarly situated non-depository institutions.

2. The system of claim 1, wherein the web site includes a plurality of pages with forms for collecting and displaying financial information.

3. The system of claim 1, wherein employees of each of the non-depository institutions enter the web site through a web browser.

4. The system of claim 1, wherein the user interface is configured to allow entering detailed financial information into the web site only after a user is associated with a non-depository institution by entering information in at least one registration form on the web site, wherein upon entering the registration information, the system enables the non-depository institution to enter secure portions of the web site.

5. The system of claim 4, wherein the registration form includes information associated with the non-depository institution, information associated with at least one contact person, and identifiers for each federally chartered corporation with which the non-depository institution does business.

6. The system of claim 5, wherein the information associated with the contact person includes an e-mail address for the contact person.

7. The system of claim 1, wherein the detailed financial information for each predefined period must be entered before predefined deadlines.

8. The system of claim 7, wherein the processing component comprises means for notifying non-depository institutions that have not reported detailed financial information after the predefined deadlines.

9. The system of claim 7, wherein the processing component comprises a notification component configured to provide a notification to non-depository institutions that have not reported detailed financial information at predefined times prior to the predefined deadlines.

10. The system of claim 7, wherein after the predefined deadlines portions of web site for entering detailed financial information for a given time period is automatically disabled.

11. The system of claim 1, wherein the web site comprises broadcast message boards and posting boards for broadcasting messages to all non-depository institutions.

12. The system of claim 1, wherein each non-depository institution provides information to the system by entering the information on the web site.

13. The system of claim 1, wherein the user interface component is adapted to receive information from each non-depository institution by electronically transferring from databases associated with the non-depository institution to the at least one database operatively connected to the processing component.

14. The system of claim 1, wherein the web site includes at least one editing function for enabling non-depository institutions to edit information entered into the web site prior to submission to the system.

15. The system of claim 1, wherein the web site includes at least one error correction function for enabling non-depository institutions to correct information entered into the web site after submission to the system.

16. The system of claim 1, wherein the processing component uses the information entered by all non-depository institutions to determine the risk associated with doing business with the non-depository institution.

17. A method for facilitating in accessing and reporting detailed financial information from non-depository financial institutions and for enabling comparison of performance of similarly situated non-depository institutions, the method comprising the steps of:

receiving in a computer system detailed financial information from a non-depository financial institution system via a user interface having in a web site the detailed financial information associated with predefined periods from a plurality of similarly situated non-depository financial institutions the financial information including at least balance sheet information, loan origination information, and loan portfolio information;

converting, via the computer system, the information to appropriate formats and storing the information from each of the plurality of similarly situated non-depository institutions in a database associated with the web site;

determining via the computer system, the risk associated with doing business with each non-depository institution from the information entered by each of the plurality of similarly situated non-depository institutions locking portions of the user interface preventing collection of information after a deadline;

receiving in the computer system an query regarding risk associated with doing business with at least one of the plurality of non-depository institutions; and generating, via the computer system, financial analytical information regarding the plurality of non-depository institutions and transmitting to the nondepository institution system a peer report for comparing the financial performance of the queried at least one of the plurality of non-depository institutions to the financial performance of the remaining plurality of similarly situated financial institutions.

18. The method of claim 17, further comprising the steps of:

registering each non-depository financial institution prior to the step of collecting; and the computer system receiving from the nondepository financial institute system a password for entering secured portions of a web site.

19. The method of claim 17, wherein the step of collecting further comprises the step of selecting a time period that is associated with the financial information.

20. The method of claim 17, wherein the step of collecting further comprises the step of entering the detailed financial information into forms on a web site.

21. The method of claim 17, wherein the step of collecting further comprises the step of linking databases with the detailed financial information with a database associated with the web site.

22. The method of claim 17, wherein the step of collecting further comprises the step of editing the detailed financial information prior to submission to the web site.

23. The method of claim 17, wherein the step of collecting further comprises the step of correcting the detailed financial information after submission to the web site.

* * * * *